United States Patent
Koppers et al.

(10) Patent No.: US 6,809,148 B1
(45) Date of Patent: Oct. 26, 2004

(54) POLYMER DISPERSIONS AS AN ADDITIVE IN BUILDING MATERIALS

(75) Inventors: Markus Koppers, Walsrode (DE);
Joachim Pakusch, Speyer (DE);
Hermann Anders, Meckenheim (DE);
Marco Schmidt, Mannheim (DE);
Hans-Jürgen Denu, Friedelsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/383,609

(22) Filed: Mar. 10, 2003

(30) Foreign Application Priority Data

Mar. 22, 2002 (DE) .......................... 102 13 026

(51) Int. Cl.⁷ ............. C08F 220/10; C08F 220/06; C08F 220/20
(52) U.S. Cl. ............. 524/552; 524/555; 524/556; 524/558; 524/560; 524/570; 524/571; 524/2
(58) Field of Search ........................ 524/552, 555, 524/556, 558, 560, 570, 571, 577, 2

(56) References Cited

U.S. PATENT DOCUMENTS

| | | | |
|---|---|---|---|
| 5,576,378 A | * | 11/1996 | Kuhlmann et al. ......... 524/523 |
| 5,900,451 A | * | 5/1999 | Krishnan et al. .......... 524/502 |
| 2002/0049265 A1 | | 4/2002 | Dreher et al. |
| 2002/0061955 A1 | * | 5/2002 | Colvin et al. ............. 524/493 |

FOREIGN PATENT DOCUMENTS

| | | |
|---|---|---|
| AT | 359 904 | 6/1977 |
| DE | 100 40 825 A 1 | 3/2002 |
| EP | 0 537 411 A1 | 4/1993 |
| JP | 53-134823 | 11/1978 |

* cited by examiner

Primary Examiner—David W. Wu
Assistant Examiner—Satya Sastri
(74) Attorney, Agent, or Firm—Oblon, Spivak, McClelland, Maier & Neustadt, P.C.

(57) ABSTRACT

Polymer dispersions comprise at least one copolymer which contains, as polymerized monomers, a) from 25 to 70% by weight of at least one conjugated aliphatic diene, b) from 25 to 70% by weight of at least one vinylaromatic monomer, c) from 2.5 to 15% by weight of at least one monoester of a $C_2$–$C_{10}$-alkanediol with acrylic acid or methacrylic acid or c') from 0.1 to 10% by weight of at least one alkylpolyethylene glycol (meth)acrylate of the formula (I)

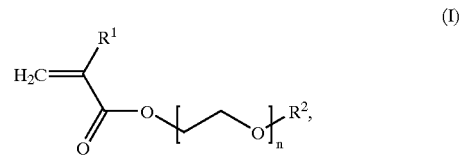

where $R^1$ is hydrogen or methyl, $R^2$ is $C_1$–$C_4$-alkyl and n is an integer from 1 to 100, or c") from 2 to 15% by weight of a mixture of the monoester c) and the alkylpolyethylene glycol (meth)acrylate c'), d) from 0 to 1.0% by weight of ethylenically unsaturated monomers which have at least one acid group, or salts thereof, e) from 0 to 5.0% by weight of ethylenically unsaturated nitriles and f) from 0 to 1.0% by weight of amides of α,β-ethylenically unsaturated mono- and dicarboxylic acids.

The polymer dispersions described are suitable, inter alia, as additives in building materials based on hydraulic binders.

18 Claims, No Drawings

POLYMER DISPERSIONS AS AN ADDITIVE IN BUILDING MATERIALS

The present invention relates to polymer dispersions comprising at least one copolymer which contains, as polymerized monomers, a) from 25 to 70% by weight of at least one conjugated aliphatic diene, b) from 25 to 70% by weight of at least one vinylaromatic monomer, c) from 2.5 to 15% by weight of at least one monoester of a $C_2$–$C_{10}$-alkanediol with acrylic acid or methacrylic acid or c') from 0.1 to 10% by weight of at least one alkylpolyethylene glycol (meth)acrylate of the formula (I)

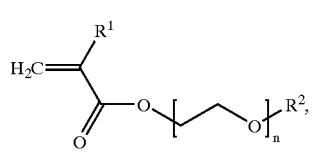

where $R^1$ is hydrogen or methyl, $R^2$ is $C_1$–$C_4$-alkyl and n is an integer from 1 to 100, or c") from 2 to 15% by weight of a mixture of the monoester c) and the alkylpolyethylene glycol (meth)acrylate c'), d) from 0 to 1.0% by weight of ethylenically unsaturated monomers which have at least one acid group, or salts thereof, e) from 0 to 5.0% by weight of ethylenically unsaturated nitriles and f) from 0 to 1.0% by weight of amides of α,β-ethylenically unsaturated mono- and dicarboxylic acids.

The present invention furthermore relates to the use of the novel polymer dispersions as an additive in building materials and a process for improving the mechanical strength, elasticity and processibility of building materials.

Hydraulic binders are understood as meaning mineral substances which are processed together with water and, if required, additives and conventional assistants to give a material which is plastic in the moist state and solidifies to a stone-like material after a certain time when left to stand in the air or in the water, if required with exposure to elevated temperatures. Examples of hydraulic binders are cement, gypsum, lime and clay.

The use of polymer dispersions or the polymer powders or polymer granules obtainable from these for improving the properties of building materials based on hydraulic binders is known in principle. Polymer dispersions for use with hydraulic binders have, as a rule, a high proportion of polar and/or ionic auxiliary monomers, such as (meth)acrylic acid and (meth)acrylamide, and a high content of emulsifiers. These measures are intended to improve the stability of the dispersions in the presence of the hydraulic binders since the high electrolyte content of the hydraulic binders leads to considerable destabilization of disperse systems.

In order to increase the mechanical strength of building materials based on hydraulic binders in the hardened state, polymer dispersions whose polymers have a high glass transition temperature ($T_g$) are frequently used. Thus, EP-A-537 411 describes the use of polymer dispersions having a $T_g > +30°$ C. as an additive for cement. The additive is intended to improve the strength of cement-bound materials and to prolong the open time.

Building materials based on hydraulic binders which contain such polymer dispersions are comparatively brittle and exhibit in particular poor low-temperature flexibility. This is presumably due to the fact that, owing to the high $T_g$ of the polymer, no film formation of the latex particles in the building materials takes place.

In order to reduce the brittleness and to increase the low-temperature flexibility of hardened building materials based on hydraulic binders, polymer dispersions which contain polymers having a low $T_g$ are therefore used. Thus, AT-359 904 describes the use of polymer dispersions having a $T_g$ of −70 to −8° C. as an additive for cement-containing building materials. By adding from 3 to 35% by weight of such dispersions, mortars which have high low-temperature flexibility after hardening are said to be obtained. However, the addition of these dispersions leads to building materials having low strength.

JP-A 53134823 discloses a polymer dispersion which comprises, inter alia, conjugated dienes, monomers, such as styrene, acrylonitrile and esters of acrylic acid or of methacrylic acid, and unsaturated esters of carboxylic acids having hydroxyl groups. The polymer dispersions described there are said to be employed for modifying cement-containing systems which are preferably used as non-bleeding underwater concretes. From 8 to 40 parts by weight of the polymer dispersion are used per 100 parts by weight of cement. The compositions mentioned in this application are all prepared using an amount of initiator which does not exceed 0.125 mol %, based on the monomers. Owing to the relatively small amount of initiator and the relatively large amount of acid, the compositions claimed there are only poorly processible in particular in cement-containing sealing slurries.

The prior application DE-A 10040825.7 relates to the use of ammonia-free polymer dispersions as an additive in building materials based on hydraulic binders. The polymer dispersions described there comprise, as monomers, inter alia from 40 to 80% by weight of an ester of acrylic acid, from 10 to 40% by weight of a vinylaromatic monomer and from 2 to 15% by weight of a monoester of a $C_2$–$C_{10}$-alkanediol with acrylic acid or methacrylic acid. Such polymer dispersions have in particular high shear stability and electrolyte stability and, as additives in building materials, lead to improved mechanical properties of these building materials in the hardened state. For some applications, in particular for seals, the polymer dispersions laid open there exhibit relatively high water absorption and insufficient water tightness.

It is an object of the present invention to remedy the disadvantages described and to provide improved polymer dispersions which, inter alia, have high hydrolysis stability and water tightness and, when added to building materials based on hydraulic binders, lead to improved mechanical properties of the building materials in the hardened state, in particular to increased tensile strength and elongation at break. Furthermore, the improved polymer dispersions should be readily processible and flexible.

We have found that this object is achieved by novel polymer dispersions comprising at least one copolymer which contains, as polymerized monomers, a) from 25 to 70% by weight of at least one conjugated aliphatic diene, b) from 25 to 70% by weight of at least one vinylaromatic monomer, c) from 2.5 to 15% by weight of at least one monoester of a $C_2$–$C_{10}$-alkanediol with acrylic acid or methacrylic acid or c') from 0.1 to 10% by weight of at least one alkylpolyethylene glycol (meth)acrylate of the formula (I)

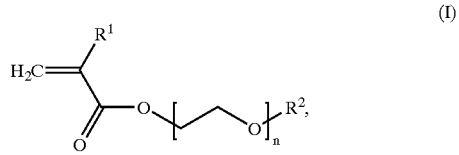

where $R^1$ is hydrogen or methyl, $R^2$ is $C_1$–$C_4$-alkyl and n is an integer from 1 to 100, or c") from 2 to 15% by weight of a mixture of the monoester c) and the alkylpolyethylene glycol (meth)acrylate c'), d) from 0 to 1.0% by weight of ethylenically unsaturated monomers which have at least one acid group, or salts thereof, e) from 0 to 5.0% by weight of ethylenically unsaturated nitriles and f) from 0 to 1.0% by weight of amides of α,β-ethylenically unsaturated mono- and dicarboxylic acids.

The present invention furthermore relates to the use of the above-defined, aqueous polymer dispersions as an additive in building materials based on hydraulic binders. The copolymer contained in the novel polymer dispersions acts as a film-forming component. In the context of this invention, building materials based on hydraulic binders are both the hydraulic binders themselves and building materials which contain at least 5, in particular 10, particularly preferably at least 25, % by weight of at least one hydraulic binder. The use in building materials which contain cement as a binder is preferred.

The building materials based on hydraulic binders are generally converted into a processible form, generally into the form of liquid or plastically deformable materials, in general by adding water (mixing water) and, if required, conventional mineral and/or nonmineral additives. As a rule, these materials harden in the course of time when left to stand. Typical building materials based on hydraulic binders which are processed in this manner are cement, mortar, renders, tile adhesives, mineral sealing slurries, concrete and the like. These building materials differ substantially in the amount and type of additives contained and/or the water content during use for building.

According to the invention, a polymer dispersion as described herein is added to the building materials based on hydraulic binders. The addition can be effected, for example, during conversion of the building materials into the processible form, for example by replacing at least a part of the mixing water with a polymer dispersion as described here. The novel use of the polymer dispersion can also be effected in the form of a powder or granules obtained by drying the dispersion. These powders or granules can be added to the building materials based on hydraulic binders both in the dry state (i.e. before the addition of water) and during or after the addition of water.

All stated amounts with regard to the hydraulic binders and the building materials based on hydraulic binders relate to their solids content, unless stated otherwise. The solids content of the hydraulic binders and of the building materials based on hydraulic binders can be determined by drying for 24 hours at 120° C. The mineral fraction is understood as meaning the dry solids of the building materials without added porous substances, in particular organic porous substances. In most cases, the mineral fraction of the building materials based on hydraulic binders can be determined by ignition of a comminuted or uncomminuted sample of the building materials.

All stated amounts which relate to the novel polymer dispersions and their components, in particular the copolymer, the emulsifier and any assistants present, are calculated as solid, unless stated otherwise. The solids contents of the polymer dispersions and of the liquid dispersion components, for example the generally aqueous solutions of the emulsifiers, can be determined by drying at 120° C. to constant weight.

Preferably, the copolymer dispersed in water is present as polymer particles having mean particle sizes of from 50 to 1 000 nm, in particular from 50 to 500 nm, particularly preferably from 60 to 300 nm. The copolymer contains ethylenically unsaturated monomers as polymerized units. The stated amounts of the polymerized monomers sum to 100% by weight. The mean particle sizes are established in a known manner, for example by initially taking a seed latex, by a seed latex formed in situ at the beginning of the polymerization, by the emulsifier concentration or by a combination of these measures.

The copolymer present in the novel polymer dispersions contains from 25 to 70, in particular from 35 to 60, % by weight of at least one conjugated aliphatic diene as monomer a). Suitable conjugated aliphatic dienes are in particular conjugated, aliphatic $C_4$–$C_{12}$-dienes, for example buta-1,3-diene or isoprene.

The copolymers preferably contain, as monomers b), from 25 to 70, particularly preferably from 35 to 60, % by weight of at least one monounsaturated vinylaromatic monomer. Suitable vinylaromatic monomers are styrene, α-methylstyrene, α-phenylstyrene, o-chlorostyrene, vinyltoluenes and mixtures thereof. A particularly preferred vinylaromatic is styrene.

The monomers a) and b) (main monomers) together account for, as a rule, from 80 to 97.5, preferably from 85 to 97.5, particularly preferably from 90 to 97, % by weight of all polymerized monomers. Particularly preferred monomer combinations of monomers b) and monomers a) are the combinations styrene/1,3-butadiene and styrene/isoprene.

The copolymer preferably contains, as monomers c), from 2.5 to 15, particularly preferably from 2.5 to 10, % by weight of at least one monoester of a $C_2$–$C_{10}$-alkanediol with acrylic acid or methacrylic acid as polymerized units. Suitable alkanediols are linear $C_2$–$C_{10}$-alkanediols, branched $C_3$–$C_{10}$-alkanediols and $C_5$–$C_{10}$-cycloalkanediols, preferably linear $C_2$–$C_6$-α,ω-alkanediols. Examples of suitable monomers c) are hydroxyethyl acrylate, hydroxyethyl methacrylate, 3-hydroxypropyl acrylate, 3-hydroxypropyl methacrylate, 2-hydroxypropyl acrylate, 2-hydroxypropyl methacrylate, 4-hydroxybutyl acrylate and 4-hydroxybutyl methacrylate.

Instead of the monomer c), the copolymer may also contain from 0.1 to 10, in particular from 0.5 to 5.0, % by weight of at least one alkylpolyethylene glycol (meth) acrylate of the formula (I)

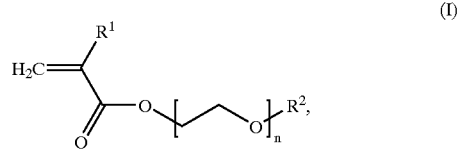

as monomer c'), where $R^1$ is hydrogen or methyl, $R^2$ is $C_1$–$C_4$-alkyl and n is an integer from 1 to 100.

Compounds of the formula (I) in which $R^2$ is methyl and n is an integer from 5 to 55, in particular from 5 to 30, are preferred.

Moreover, it is also possible for the copolymer present in the novel polymer dispersions to contain from 2 to 15, in particular from 2 to 10, % by weight of a mixture c" of the monoester c) and the alkylpolyethylene glycol (methacrylate) c'. In such a mixture, the amount of the monoester c) is from 1 to 90, in particular from 1 to 50, % by weight, based on the total mixture c").

According to the invention, the copolymer contains, as monomers d), from 0 to 1.0% by weight of ethylenically unsaturated monomers which have at least one acid group, for example a carboxyl group or a sulfo group, or salts thereof as polymerized units. Preferably, the copolymer therefore either contains from 0.1 to 1.0, in particular from 0.2 to 1, especially from 0.2 to 0.8, % by weight of at least one monomer d) as polymerized units or is substantially free of polymerized monomers d) (amount by weight <0.1, in particular <0.05, particularly preferably <0.01 or 0, % by weight). α,β-Ethylenically unsaturated $C_3$–$C_6$-monocarboxylic acids, such as acrylic acid or methacrylic acid, and monoethylenically unsaturated $C_4$–$C_8$-dicarboxylic acids, such as maleic acid, fumaric acid, itaconic acid and citraconic acid, are suitable as monomers d). Suitable monomers d) are furthermore ethylenically unsaturated monomers which contain a sulfo group, such as vinylsulfonic acid, 2-acrylamido-2-methylpropanesulfonic acid, 2-acryloyloxyethanesulfonic acid and 2-methacryloyloxyethanesulfonic acid, and salts thereof, preferably ammonium salts thereof, in particular ammonium salts of amines which are nonvolatile at room temperature, and preferably alkali metal salts thereof, in particular sodium salts thereof. Acrylic acid and methacrylic acid are preferred.

The copolymers furthermore contain from 0 to 5% by weight of ethylenically unsaturated nitriles, such as acrylonitrile or methacrylonitrile (monomers e)). Particularly preferably, the copolymers are substantially free of such nitriles or contain these in an amount of from 0.1 to not more than 3.5, in particular not more than 2.0, % by weight. A low content of polymerized nitriles is advantageous for low water absorption of the building materials modified according to the invention.

The copolymers furthermore contain from 0 to 1.0% by weight of amides of α,β-ethylenically unsaturated mono- and dicarboxylic acids (monomers f). Particularly preferably, the novel polymer dispersions are free or substantially free of amides of carboxylic acids. A very low content of amides of α,β-ethylenically unsaturated carboxylic acids is advantageous for the low degree of odor development of the novel dispersions in the presence of hydraulic binders.

Moreover, the copolymers may contain small amounts of further monomers, as usually used in the preparation of aqueous polymer dispersions.

Suitable further comonomers are, for example, silicon-containing monomers, in particular silyl-containing monomers, such as vinyltrialkoxysilanes, e.g. vinyltrimethoxysilane, alkylvinyldialkoxysilanes or (meth) acryloyloxyalkyltrialkoxysilanes, e.g. (meth) acryloyloxyethyltrimethoxysilane, (meth) acryloyloxypropyltrimethoxysilane and trimethoxysilylpropyl methacrylate, glycidyl-containing monomers, in particular glycidyl (meth)acrylate, glycidyl vinyl ether, 1,3-diketo-containing monomers, in particular acetoxyethyl (meth)acrylate and diacetone(meth) acrylamide, monomers containing urea groups, such as ureidoethyl (meth)acrylate, acrylamidoglycolic acid and methyl methacrylamidoglycolate. If these further comonomers are contained in the novel polymer dispersions, they are as a rule incorporated by polymerization into the copolymers in amounts of from 0.1 to 10, preferably not more than 5, % by weight.

The copolymers used are known or commercially available or can be prepared by known methods.

The copolymers are prepared as a rule by means of free radical, aqueous emulsion polymerization in the presence of at least one free radical polymerization initiator and, if required, one or more surface-active substances.

The aqueous emulsion polymerization can be carried out in a conventional manner, as described, for example, in Encyclopedia of Polymer Science and Technology, Vol. 5, Wiley & Sons Inc., NY 1966, page 847). Copolymers dispersed in water and in the form of multiphase particles can also be used. Their preparation can be carried out, for example, by sequential processes as described, for example, in EP-A 555 959, EP-A 308 753 and EP-A 654 454.

The polymerization is carried out in a conventional manner in the presence of compounds (initiators) forming free radicals. Preferably from 0.2 to 5, particularly preferably from 0.25 to 3, mol %, based on the monomers used in the polymerization, of these compounds, are required. Conventional initiators include sodium peroxodisulfate, potassium peroxodisulfate and ammonium peroxodisulfate.

In order to control the molecular weight of the copolymer, polymerization is usually carried out in the presence of substances which regulate the molecular weight, such as mercaptans, e.g. n-dodecyl mercaptan or tert-dodecyl mercaptan. Typically, the amounts of these regulators used are from 0.1 to 5, in general up to 2.5, % by weight, based on the amount of the monomers to be polymerized. The regulator is usually added simultaneously with the monomers. In order to control the course of the polymerization, however, it is also possible to add the regulator independently of the monomers at a later time or in special metering profiles.

Surface-active substances suitable for carrying out the emulsion polymerization are the protective colloids and emulsifiers usually used for these purposes. The surface-active substances are usually used in amounts of from 0 to 10, preferably from 0.1 to 7.5, in particular from 0.5 to 5, % by weight, based on the monomers to be polymerized.

Suitable protective colloids are, for example, polyvinyl alcohols, starch derivatives and cellulose derivatives or vinylpyrrolidone-containing copolymers. A detailed description of further suitable protective colloids is to be found in Houben-Weyl, Methoden der organischen Chemie, Volume XIV/1, Makromolekulare Stoffe, Georg-Thieme-Verlag, Stuttgart 1961, pages 411–420. Mixtures of emulsifiers and/or protective colloids can also be used.

Preferably, no protective colloids were used in the preparation of the copolymers. If the polymer dispersions contain protective colloids, they are preferably not added until after the preparation of the polymer dispersion.

Exclusively emulsifiers whose relative molecular weights, in contrast to the protective colloids, are usually below 2 000, are particularly preferably used as surface-active substances. They may be either anionic, cationic or nonionic. The emulsifiers used in this invention are preferably nonionic or anionic emulsifiers. While the nonionic emulsifiers are generally nonionic alkoxylated emulsifiers, in the case of the anionic emulsifiers a distinction is made below between anionic nonalkoxylated emulsifiers and anionic alkoxylated emulsifiers.

The anionic nonalkoxylated emulsifiers include alkali metal and ammonium salts of alkylsulfates (alkyl radical: $C_8$–$C_{40}$), for example of sulfuric monoesters of $C_8$–$C_{22}$-fatty alcohols or of $C_8$–$C_{32}$-oxo alcohols, of alkanesulfonic acids (alkyl radical: $C_{12}$–$C_{18}$) of di-$C_6$–$C_{25}$-alkyl sulfosuccinates and of alkylarylsulfonic acids (alkyl radical: $C_6$ to $C_{32}$), for example of $C_6$–$C_{32}$-alkylphenols. Further suitable emulsifiers are to be found in Houben-Weyl, Methoden der organischen Chemie, Volume XIV/1, Makromolekulare Stoffe, Georg-Thieme-Verlag, Stuttgart, 1961, pages 192–208.

The anionic nonalkoxylated emulsifiers also include compounds of the formula II,

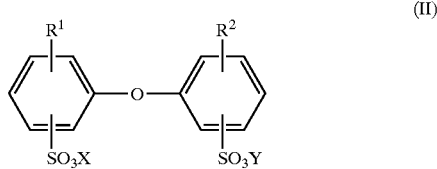

(II)

where $R^1$ and $R^2$ are hydrogen or $C_4$–$C_{24}$-alkyl and are not simultaneously hydrogen, and X and Y may be alkali metal ions and/or ammonium ions. X and Y are preferably sodium, potassium or ammonium, sodium being particularly preferred. Frequently, industrial mixtures which contain from 50 to 90% by weight of the monoalkylated product are used, for example Dowfax® 2A1 (trade-mark of Dow Chemical Company). The compounds II are generally known, for example from U.S. Pat. No. 4,269,749, and are commercially available.

The polymer dispersions which contain alkoxylated emulsifiers, in particular nonionic alkoxylated emulsifiers and/or anionic alkoxylated emulsifiers, are advantageous for the use according to the invention. The alkoxylated emulsifiers improve both the handling properties of the novel copolymers, for example the miscibility and processibility of copolymer and hydraulic binder and the compatibility of the polymer with the hydraulic binder, and the handling properties and mechanical properties of the hydraulic binder modified with the copolymer.

Alkoxylated emulsifiers are emulsifiers which have oligoalkylene oxide or polyalkylene oxide units in the hydrophilic moiety. Usually, alkoxylated emulsifiers are obtained by reacting lipophilic compounds or compounds which have lipophilic groups with alkylene oxides, in particular ethylene oxide and/or propylene oxide. Such alkoxylated emulsifiers may additionally be modified with ionic, in particular anionic, groups. Accordingly, a distinction is made between anionic alkoxylated emulsifiers which have at least one anionic or one anionogenic group and nonionic alkoxylated emulsifiers which have no such group.

Examples of lipophilic compounds or compounds which have lipophilic groups are aliphatic, aromatic and/or aromatic-aliphatic alcohols, amides, amines and carboxylic acids and derivatives thereof. The lipophilic compounds or compounds which have lipophilic groups are preferably selected from fatty acids, fatty alcohols, oxo alcohols, the amines, amides and salts derived therefrom, phenols, alkylphenols, hydroxy- or aminonaphthalenes, dicarboxylic acids and esters or monoesters thereof and polyalkylene oxides which are lipophilic or have lipophilic segments and carry at least one hydroxyl group, for example polypropylene oxide, polybutylene oxide and random copolymers or block copolymers of ethylene oxide, propylene oxide and/or butylene oxide.

The degree of alkoxylation of such alkoxylated emulsifiers is as a rule from 2 to 150, preferably from 3 to 100, particularly preferably from 4 to 50.

Examples of preferred nonionic aliphatic alkoxylated emulsifiers are ethoxylated and ethoxylated/propoxylated, preferably ethoxylated, $C_6$–$C_{32}$-fatty alcohols and amines, $C_6$–$C_{60}$-oxo alcohols and amines, linear primary $C_6$–$C_{60}$ Ziegler alcohols, fatty alkylolamides, fatty acids and fatty amides which have a degree of alkoxylation of from 3 to 100, preferably from 4 to 50, and polyalkylene oxide adducts, such as ethylene oxide/propylene oxide block copolymers.

Preferred nonionic aliphatic alkoxylated emulsifiers are selected from ethoxylated $C_6$–$C_{32}$-fatty alcohols, preferably $C_8$–$C_{20}$-fatty alcohols, in particular $C_9$–$C_{16}$-fatty alcohols, for example predominantly slightly branched fatty alcohols which are obtainable by reduction of naturally occurring fatty acids, and ethoxylated $C_6$–$C_{32}$-oxo alcohols, preferably $C_8$–$C_{20}$-oxo alcohols, in particular $C_9$–$C_{16}$-oxo alcohols, which are generally more highly branched compared with the fatty alcohols and have an average degree of ethoxylation of from 2 to 150, preferably from 4 to 50, in particular from 6 to 30, for example from 8 to 15 or from 12 to 25. Examples of preferred nonionic aliphatic alkoxylated emulsifiers are ethoxylated lauryl alcohol having a degree of ethoxylation of from 4 to 50, in particular from 8 to 25, such as the Lutensol grades LUTENSOL® AT18 and AT25 from BASF Aktiengesellschaft. Particularly preferred emulsifiers include alkyl alcohol ethoxylates having 5 to 30 ethoxy units or alkyl alcohol propoxylates having 5 to 30 propoxy units.

Examples of nonionic aromatic or aromatic-aliphatic alkoxylated emulsifiers are ethoxylated and ethoxylated/propoxylated, preferably ethoxylated, $C_6$–$C_{32}$-alkylphenols, in particular $C_6$–$C_{16}$-alkylphenols, having an average degree of alkoxylation of from 2 to 150, preferably from 3 to 100, in particular from 3 to 50.

The anionic groups of anionic alkoxylated emulsifiers are usually selected from the sulfate groups, sulfonate groups, carboxylate groups, phosphonate groups and phosphate groups. Suitable opposite ions of the anionic groups are cations, for example sodium, potassium, calcium or ammonium ions and mixtures thereof. The opposite ion preferably differs from ammonium ions of readily volatile amines, such as ammonia, methylamine or ethylamine. A preferred opposite ion is the sodium ion. Preferred anionic groups are the sulfate group and the sulfonate group.

Examples of anionic alkoxylated emulsifiers are the sulfuric acid monoesters and phosphoric acid monoesters of the abovementioned nonionic alkoxylated emulsifiers, and $C_8$–$C_{32}$-alkenylpolyethoxysulfonates or -sulfates, $C_8$–$C_{32}$-alkylglycerylpolyethoxysulfonates, ethoxylated sulfosuccinic monoesters and diesters, $C_8$–$C_{32}$-alkenyl- or dialkylpolyethoxyphosphates, ethoxylated mono- and dialkylbiphenyl ether mono- and polysulfonated on the nucleus, ethoxylated α-sulfo fatty esters, ethoxylated fatty alkanolamine sulfates, sulfonated or sulfated ethoxylated fatty esters, fatty acid sarcosides, glycolates, lactates, taurides and isothionates, which have a degree of alkoxylation of from 2 to 150, preferably from 2 to 100, particularly preferably from three to 50, and salts thereof, in particular the alkali metal salts, for example the sodium or potassium salts, or the ammonium salts, for example the salts with organic amines, such as mono-, di- or tri-$C_1$–$C_4$-alkylamines or mono-, di- or triethanolamines.

Preferred anionic aliphatic alkoxylated emulsifiers are selected from the sulfuric monoesters of ethoxylated $C_8$–$C_{20}$-fatty alcohols, in particular $C_9$–$C_{16}$-fatty alcohols, for example predominantly slightly branched fatty alcohols which are obtainable by reduction of naturally occurring fatty acids, and ethoxylated. $C_8$–$C_{32}$-oxo alcohols, in particular $C_9$–$C_{16}$-oxo alcohols, which are generally more highly branched compared with the fatty alcohols and have an average degree of ethoxylation of from 2 to 50, in particular from 2 to 30, for example from 2 to 15 or from 9 to 30.

Preferred anionic aromatic or anionic aromatic-aliphatic alkoxylated emulsifiers are selected from the sulfuric monoesters of ethoxylated and ethoxylated/propoxylated, preferably ethoxylated, $C_6$–$C_{32}$-alkylphenols, in particular $C_6$–$C_{16}$-alkylphenols, particularly preferably octylphenol and nonylphenol, which have an average degree of alkoxylation of from 2 to 50, in particular from 2 to 35.

If required, the novel formulations may also contain nonalkoxylated emulsifiers, but as a rule at least 20, preferably at least 30, % by weight of the emulsifiers used are alkoxylated emulsifiers. In one embodiment, the novel formulations are substantially free of nonalkoxylated emulsifiers. Other preferred embodiments relate to those formulations which contain at least one nonionic alkoxylated emulsifier and at least one anionic emulsifier selected from alkoxylated and anionic nonalkoxylated emulsifiers.

The novel polymer dispersions or the polymer powders or polymer granules obtainable from them by drying, i.e. by removal of at least 80, preferably at least 85 or at least 90, % by weight of the volatile components, preferably contain from 0.2 to 10, especially from 0.5 to 5, % by weight, based on the polymer fraction, of at least one emulsifier.

In a preferred embodiment of the present invention, at least one nonionic alkoxylated emulsifier, preferably a nonionic aliphatic alkoxylated emulsifier, is used as the alkoxylated emulsifier.

If the novel copolymers contain a mixture of at least one anionic emulsifier and at least one nonionic alkoxylated emulsifier, as a rule from 15 to 90, preferably from 25 to 80, preferably from 40 to 70, % by weight of the total amount of emulsifiers present are accounted for by anionic emulsifiers.

The abovementioned surface-active substances, in particular the emulsifiers, can be completely or partly used in the preparation of the copolymers, completely or partly added after the preparation of the copolymers or completely or partly added during the use for the preparation of the novel building materials. In the preparation of the copolymers to be used according to the invention by free radical emulsion polymerization in aqueous media, it has proven advantageous to use at least 25, preferably at least 35, particularly preferably at least 50, % by weight of the total amount of the emulsifiers in the preparation of the copolymers.

In some embodiments, the total amount of emulsifier is used substantially in the preparation of the copolymers. In other preferred embodiments, from 30 to 65, preferably from 35 to 60, particularly preferably from 40 to 55, % by weight of the total amount of the emulsifiers used, in particular of the ionic emulsifiers, are added in the course of the free radical emulsion polymerization. The remaining amount of emulsifier is added after the end of the polymerization (subsequent saponification). The same or different emulsifiers can be used for the preparation and the subsequent saponification, it being possible for the mixing ratio of the emulsifiers for the preparation of the copolymers and for subsequent saponification to be different when a plurality of emulsifiers is used. In particular, anionic alkoxylated emulsifiers and/or anionic nonalkoxylated emulsifiers can be added for the subsequent saponification.

In order to achieve a sufficient improvement in the mechanical strength of the building materials based on hydraulic binders, it is advisable as a rule to use copolymers having glass transition temperatures above −60° C., preferably above −50° C. The copolymers therefore preferably have a glass transition temperature $T_g$ of >−45° C., particularly preferably >−40° C., in particular >−35° C.

In order to achieve a sufficient improvement in the flexibility, in particular the low-temperature flexibility, of the building materials, the copolymers should be capable of film formation in the building materials based on hydraulic binders. The copolymers to be used according to the invention therefore generally have a glass transition temperature $T_g$ of <+40° C., preferably <+30° C., particularly preferably <+20° C., very particularly preferably <+10° C., in particular <0° C.

Suitable copolymers for the novel use therefore have glass transition temperatures $T_g$ of more than −30° C., in particular more than −25° C., particularly preferably more than −20° C., very particularly preferably more than −15° C.

The glass transition temperature $T_g$ is understood here as meaning the midpoint temperature determined according to ASTM D 3418-82 by differential thermal analysis (DSC) (cf. Ullmann's Encyclopedia of Industrial Chemistry, 5th Edition, Volume A 21, VCH Weinheim 1992, page 169, and Zosel, Farbe und Lack 82 (1976), 125–134, also see DIN 53765).

In the case of polymer dispersions which contain copolymer components having different glass transition temperatures, it is as a rule advantageous if at least the main component has a glass transition temperature $T_g$ in one of the abovementioned ranges. Such formulations are obtainable, for example, by mixing two or more different copolymers or by polymerization processes which lead, for example, to step polymers, polymer particles having a core-shell morphology or other copolymer particles having a nonrandom composition.

The glass transition temperature $T_g$ can be brought to a desired value both by the choice of the appropriate monomers and by the ratios of the monomers used in the copolymer or the copolymers.

In this context, it proves helpful to estimate the glass transition temperature $T_g$ of the copolymer P. According to Fox (T. G. Fox, Bull. Am. Phys. Soc. (Ser. II) 1 (1956), 123, and Ullmanns Enzyklopädie der technischen Chemie, Weinheim (1980), pages 17–18), a good approximation for the glass transition temperature of weakly crosslinked copolymers in the case of high molar masses is $$\frac{1}{T_g} = \frac{X^1}{T_g^1} + \frac{X^2}{T_g^2} + \cdots \frac{X^n}{T_g^n}$$

where $X^1, X^2, \ldots, X^n$ are the mass fractions of the monomers $1, 2, \ldots, n$ and $T_g^1, T_g^2, \ldots, T_g^n$ are the glass transition temperatures, in degrees Kelvin, of the polymers composed in each case only of one of the monomers $1, 2, \ldots, n$. The latter are known, for example, from Ullmann's Encyclopedia of Industrial Chemistry, VCH, Weinheim, Vol. A 21 (1992), page 169 or from J. Brandrup, E. H. Immergut, Polymer Handbook $3^{rd}$ ed, J. Wiley, New York, 1989.

Methods for establishing the polymer particle size as described above are disclosed, for example, in EP-A-126 699, EP-A-567 881, EP-A-567 819, DE-A-31 47 008 and DE-A-42 13 967.

Preferably, the novel polymer dispersions have a pH of from 6.7 to 8.0, preferably from 6.8 to 7.5, particularly preferably from 6.9 to 7.2, for example 7.0 or 7.1. Nonvolatile bases are preferably used for establishing the pH of the polymer dispersions. Suitable nonvolatile bases are, for example, sodium hydroxide solution, potassium hydroxide solution and slaked lime, which can be used, for example, as a solid or as an aqueous solution (calcium hydroxide solution). Slaked lime is preferably used as an aqueous suspension. Maintaining the special pH range as described above and using the abovementioned bases have an advantageous effect on the performance characteristics of the dispersions to be used according to the invention. In particular, the compatibility of the polymer dispersions with the hydraulic binders is advantageously influenced.

The novel polymer dispersions can be added directly to the building materials based on hydraulic binders, if necessary after establishing the solids content and/or after adding conventional assistants (as described below). If aqueous dispersions are used according to the invention, the solids content of the dispersion, i.e. the amount of nonvolatile components, is as a rule from 20 to 80% by weight. The dispersions are preferably used in the form of a 30 to 70, in particular 35 to 60, particularly preferably 40 to 55, % strength by weight aqueous dispersion, based on the solids content.

The novel dispersions should preferably be free of ammonia.

The viscosity of the aqueous dispersions is as a rule from 10 to 2 500, preferably from 20 to 500, mPa.s, measured as a 55% strength by weight dispersion in a rotational viscometer according to DIN 53019 at 23° C. and a shear rate of 250 $s^{-1}$. The aqueous polymer dispersion may contain organic solvents, preferably water-miscible organic solvents, for example alcohols, diols and polyols. Preferably, the content of organic solvents is less than 10% by weight, based on the total weight of the polymer dispersion; particularly preferably, the polymer dispersions are substantially free of organic solvents.

The novel polymer dispersions may also be used in semisolid form, for example as pasty material, or in solid form, for example as powders or granules. Polymer powders or granules are obtainable from the polymer dispersions by drying, preferably by spray-drying.

The present invention therefore also relates to the use of polymer powders or granules which are obtainable, for example, by removing at least 80, preferably at least 90, % by weight of the volatile components from polymer dispersions as described above, as an additive for building materials based on hydraulic binders.

The polymer dispersions, polymer powders or polymer granules may contain conventional assistants. The assistants are used, as a rule, in total amounts of from 0.1 to 30% by weight, based on the copolymer. Conventional assistants are, for example, wetting agents, fungicides, biocides, antifoams, for example the commercially available antifoams from BASF (Ludwigshafen), from Münzig (Heilbronn) and from Wacker (Munich), thickeners, antifreezes, leveling agents, plasticizers and film formation assistants. Suitable film formation assistants are, for example, ethylene glycol, propylene glycol, butylene glycol, hexylene glycol, diethylene glycol, dipropylene glycol, dibutylene glycol, hemiethers thereof with $C_1$–$C_4$-alkanols, e.g. diethylene glycol monoethyl ether, diethylene glycol monobutyl ether, propylene glycol monophenyl ether, propylene glycol monopropyl ether, propylene glycol monobutyl ether, dipropylene glycol monopropyl ether, dipropylene glycol monobutyl ether, ether-acetates thereof, such as diethylene glycol monoethyl ether acetate, diethylene glycol monobutyl ether acetate, propylene glycol monopropyl ether acetate, propylene glycol monobutyl ether acetate and dipropylene glycol n-butyl ether acetate, and furthermore alkyl esters of aliphatic mono- and dicarboxylic acids, e.g. Texanol® from Eastman Kodak or industrial mixtures thereof, e.g. Lusolvan FBH from BASF AG (di-n-butyl ester mixtures of succinic, glutaric and adipic acid). Suitable plasticizers are all conventional plasticizers suitable for dispersions, for example (oligo) propylene glycol alkyl phenyl ethers, as commercially available, for example, as Plastilit® 3060 from BASF AG.

The novel polymer dispersions, polymer powders or polymer granules may additionally contain a plasticizer for hydraulic binders. Plasticizers for hydraulic binders are as a rule additives which lead to a change in the properties of building materials based on hydraulic binders, in particular the processing consistency and/or setting properties. As a rule, such plasticizers of building materials based on hydraulic binders are water-soluble macromolecular substances.

The good processability of the building materials based on hydraulic binders and modified with the dispersions to be used according to the invention can be even further improved in many cases by the presence of a plasticizer.

Plasticizers based on naphthalenesulfonic acid/formaldehyde condensates, melamine/formaldehyde polycondensates and/or ligninsulfonates, as described, for example, in EP-A-402 319, and those based on homo- and copolymers of carboxylic acids and dicarboxylic acids with styrene, as, for example, in EP-A-306 449 and U.S. Pat. No. 3,952,805, or isobutene or diisobutene, as described in DE-A-37 16 974, EP-A-338 293, DE-A-39 25 306, U.S. Pat. No. 4,586,960, U.S. Pat. No. 4,042,407 and U.S. Pat. No. 4,906,298 are preferably suitable.

Also suitable are plasticizers based on copolymers of unsaturated carboxylic acids and hydroxyalkyl esters of unsaturated carboxylic acids, as described, for example, in EP-A 97 613, those based on polymerized carboxylic acid monomers and polyalkylene oxide esters of acrylic acid and of methacrylic acid, as described, for example, in DE-A-44 20 444, those based on ethylenically unsaturated polyoxyalkylene ethers, polyunsaturated alkenyl ethers and maleic anhydride, as described, for example, in EP-A 619 277, or those based on copolymers of maleic acid derivatives and vinyl monomers, as described, for example, in DE-A-43 04 109 and EP-A-610 699.

The abovementioned publications are herewith fully incorporated by reference.

Such plasticizers are commercially available, for example, from ADDIMENT (Heidelberg), SKW (Trostberg), BASF (Ludwigshafen), in particular the Sokalan grades, and DYCKERHOFF (Wiesbaden).

The novel polymer dispersions, polymer powders or polymer granules are added to the building materials based on hydraulic binders preferably in an amount of from 20 to 200, particularly preferably from 20 to 150, in particular from 20 to 100, % by weight, based on the dry weight of the hydraulic binder. As a rule, the addition of only from 20 to 80% by weight, based on the hydraulic binder, of polymer is sufficient to achieve the desired improvement in the properties of hydraulic binders and building materials based on hydraulic binders. The addition of polymer dispersions, polymer powders or polymer granules is calculated as solid.

Conventional assistants for building materials based on hydraulic binders are in particular assistants and plasticizers described above. Suitable further assistants for the use in building materials are known to a person skilled in the art and are described, for example, in H. Reul, Handbuch der Bauchemie, Verlag für chemische Industrie H. Ziolkowsky KG, Augsburg (1991).

Suitable conventional additives for the building materials based on hydraulic binders are, for example, gravel, coarse sand, fine sand, quartz sand of different particle sizes, e.g. particle sizes of from 0.08 to 0.8 mm, quartz powder, for example having particle sizes of ≦0.09 mm, basalt, limestone, chalk, marble, trass, silicate dust, precipitated silica, coal fly ash and barium sulfate. Further suitable mineral or nonmineral additives are known to a person skilled in the art and are described, for example, in Sachstandsbericht Dt. Bauchemie: Modifizierte Mineralische Mörtelsysteme und Umwelt (1st edition, July 1998).

The present invention also relates to building materials based on hydraulic binders, which contain from 1 to 20, preferably from 1 to 10, particularly preferably from 3 to 10, % by weight, based on the dry weight of the mineral fraction, of a polymer dispersion as described above, or of a polymer powder or polymer granules obtainable therefrom, calculated as solid.

Typical building materials based on hydraulic binders, which can be improved in their properties by the use according to the invention, are cement, cement paste, concrete, mortar, render, floor topping materials, binder formulations, in particular those based on cement, road surfacings and tile adhesives. Preferred building materials are in particular mineral sealing slurries.

The building materials may be present in solid form (for example before the addition of the mixing water or of the polymer dispersion or after hardening), in liquid form and in viscous or pasty form, depending on the intended use and stage of processing.

Of course, the polymer powders obtained from the polymer dispersions can also be mixed with the mineral binder before use in the building material. Such formulations contain the hydraulic binder, preferably cement, and the polymer as a rule as main components. Furthermore, these formulations may contain conventional mineral or nonmineral additives and conventional assistants, for example as described above.

The present invention also relates to a process for improving the mechanical strength, elasticity and processibility of building materials based on hydraulic binders, in which hydraulic binder and polymer dispersion, polymer powder or polymer granules and, if required, water and/or additives are mixed with one another. Suitable mixing techniques and mixing apparatuses are known to a person skilled in the art and are described, for example, in Ullmanns Enzyklopädie der technischen Chemie, 3rd edition, 1951, Volume 1, pages 693 to 727.

The novel polymer dispersions, polymer powders or polymer granules lead to polymer-modified building materials which, compared with the prior art polymer-modified building materials based on hydraulic binders, are distinguished, inter alia, by the fact that they develop no unpleasant odor or only very slight unpleasant odor on mixing polymer and hydraulic binder and also thereafter. Moreover, in the case of a large number of building materials based on mineral binders, the novel polymer dispersions, polymer powders or polymer granules lead to improved properties in the solidified or set state, in particular to increased mechanical strength, for example increased flexibility, increased tensile strength and improved elongation at break. Furthermore, the water absorption of the building materials in the solidified or set state is substantially reduced so that they are very water tight. As a rule, the processibility of the building materials based on hydraulic binders is also improved prior to solidification, for example through an advantageous open time and through little sticking or adhesion to the tools during mixing or suspension of the hydraulic binders to give liquid, semisolid or pasty building materials. The properties of the novel dispersions, polymer powders or polymer granules are particularly advantageously displayed in the case of building materials based on cement.

The novel polymer dispersions are of course also suitable for non-cement applications, in particular for filler-containing coating systems, especially for flexible coating systems, such as flexible roof coating materials and sealing materials, and for adhesives, especially filler-containing construction adhesives, such as tile adhesives.

Typical formulations for flexible roof coating materials comprise, in addition to water, also novel polymer dispersions, pigments, such as titanium dioxide or barium sulfate, and fillers, such as calcium carbonate, chalk, talc and clays, and conventional assistants, e.g. biocides, wetting agents, film formation assistants, e.g. hydrocarbons, such as gasoline, plasticizers, solvents and antifreezes, e.g. glycerol or glycol, thickeners (e.g. associative thickeners) and antifoams. The amount of pigments is as a rule from 1 to 5 parts by weight per 1 part by weight of copolymer. The amount of assistants is as a rule from 0.5 to 25 parts by weight per 100 parts by weight of copolymer.

Typical formulations for tile adhesives comprise, in addition to the novel copolymers and water, also fillers, e.g. the abovementioned fillers and/or silicates, or silicas; furthermore assistants, e.g. the abovementioned assistants. The amount of fillers is as a rule from 5 to 10 parts by weight per 1 part by weight of copolymer. The amount of assistants is as a rule from 1 to 20 parts by weight per 100 parts by weight of copolymer. Typical formulations for tile adhesives are stated in EP-A 35 332, examples 2 and 4, which is herewith incorporated by reference.

In addition, the novel polymer dispersions or the polymer powders or polymer granules obtained therefrom can also be used as an additive in bitumen for road construction, hydraulic engineering or roof coverings. Polymer dispersions may be used both in hot bitumen and in bitumen emulsions, the latter either being anionic or cationic. Bitumen emulsions usually comprise from about 10 to 15% of polymer dispersions, from 0.1 to 2% of thickener and bitumen emulsified in water with the aid of emulsifiers. They may furthermore be mixed with cement.

The novel polymer dispersions, like the polymer powders and polymer granules obtainable therefrom, are suitable as an additive in building materials based on hydraulic binders, which are used as sealing slurries.

EXAMPLES

The novel polymer dispersions used in the novel examples and the polymer dispersions of the comparative examples were obtained by free radical polymerization in an aqueous medium.

I. Preparation of the Polymer Dispersions (Examples $E_1$–$E_7$ and Comparative Examples $V_1$ –$V_3$)

The nonvolatile fractions (solids content) were determined in a through-circulation dryer from a weight loss of a 1 g sample which was dried for two hours at 120° C. A commercial combined electrode (from Schott, type Handylab 1) was used for measuring the pH. The glass transition temperature $T_g$ was determined with the aid of a differential calorimeter DSC 820 from Mettler Toledo at a heating rate of 5° C./min.

Abbreviations Used:
EDTA: Ethylenediaminetetraacetate
EO: Ethylene oxide units
HEA: Hydroxyethyl acrylate
HEMA: Hydroxyethyl methacrylate t-DMK: tert-Dodecyl mercaptan
PO: Propylene oxide units
EA: Ethyl acrylate
EEEA: Ethoxyethoxyethyl acrylate
AA: Acrylic acid
MAA: Methacrylic acid
NAPS: Sodium peroxodisulfate
rpm: Revolutions per minute

Example E-1

3 200 g of demineralized water, 3 g of EDTA (40% by weight) and 492 g of polystyrene seed (33% by weight) having a particle size of 30 nm were initially taken in a 40 l reactor having an anchor stirrer (80 rpm). 8 g of sodium peroxodisulfate, dissolved in 300 g of demineralized water, were added at an internal temperature of 90° C. After 10 minutes, feed 1 and feed 2 were started. Feed 1 was added in the course of 4 hours and feed 2 in the course of 4.5 hours. Polymerization was then carried out for 1 hour. Feeds 3 and 4 were then fed in spatially separately in the course of 2 hours. The let-down process of the kettle was carried out cyclically for 4 hours by means of a foam probe at 60° C. external temperature. The prepared dispersion was freed from monomers by stripping with steam.

| Initially taken mixture: | Demineralized water | 3200 g |
|---|---|---|
| | EDTA (40%) | 3 g |
| | Seed (33%) | 492 g |
| Feed 1: | Demineralized water | 300 g |
| | Sodium peroxodisulfate | 8 g |
| Feed 1: | Demineralized water | 3000 g |
| | Fatty alcohol ethoxylate with 8 EO units (20%) | 500 g |
| | Sodium laurylsulfate (15%) | 667 g |
| | Sodium hydroxide solution (25%) | 150 g |
| | Sodium pyrophosphate (3%) | 2083 g |
| | tert-Dodecyl mercaptan | 225 g |
| | HEA | 750 g |
| | Styrene | 5500 g |
| | Butadiene | 6250 g |
| Feed 2: | Demineralized water | 2200 g |
| | Sodium peroxodisulfate | 100 g |
| Feed 3: | Demineralized water | 624 g |
| | tert-Butyl hydroperoxide (70%) | 36 g |
| Feed 4: | Demineralized water | 577 g |
| | Sodiumdisulfite (40%) | 66 g |
| | Acetone | 18 g |

The polymer dispersion thus prepared contains 50.8% of nonvolatile components and has a pH of 5.9. The copolymer contained has a glass transition temperature of −19° C.

Example E-2

As for E-1, but the amount of seed in the initially taken mixture was reduced to 114 g and feed 1 was loaded with 625 g of HEA, 6 875 g of styrene, 5 000 g of butadiene and 63 g of t-DMK. 143 g of sodium peroxodisulfate were used in feed 2.

The polymer dispersion thus prepared contains 50.5% of nonvolatile components and has a pH of 5.8. The copolymer contained has a glass transition temperature of −2.5° C.

Example E-3

As for E-1, but 688 g of HEA and 63 g of AA were used as comonomers. 150 g of sodium peroxodisulfate were used in feed 2. The polymer dispersion thus prepared contains 50.8% of nonvolatile components and has a pH of 5.4. The copolymer contained has a glass transition temperature of −18° C.

Example E-4

As for E-1, but 63 g of HEA were initially taken and 688 g of HEA were added in feed 1. The amount of regulator was reduced to 150 g of t-DMK.

The polymer dispersion thus prepared contains 51.9% of nonvolatile components and has a pH of 5.9. The copolymer contained has a glass transition temperature of −18° C.

Example E-5

As for E-1, but fatty alcohol ethoxylate with 8 EO units was dispensed with and the amount of sodium laurylsulfate was reduced to 417 g. In addition, 125 g of allyl alcohol, etherified with 10 EO units, were added to the feed. The amount of initiator in feed 2 was increased to 150 g of sodium peroxodisulfate.

The polymer dispersion thus prepared contains 50.2% of nonvolatile components and has a pH of 5.5. The copolymer contained has a glass transition temperature of −17° C.

Example E-6

As for E-1, but fatty alcohol ethoxylate with 8 EO units was dispensed with and the amount of sodium laurylsulfate was reduced to 417 g. In addition, 125 g of allyl alcohol, etherified with 20 EO×20 PO units, were added to the feed. The amount of initiator in feed 2 was increased to 150 g of sodium peroxodisulfate.

The polymer dispersion thus prepared contains 51.3% of nonvolatile components and has a pH of 5.6. The copolymer contained has a glass transition temperature of −18° C.

Example E-7

As for E-1, but fatty alcohol ethoxylate with 8 EO units was dispensed with and the amount of sodium laurylsulfate was reduced to 417 g. In addition, 125 g of allyl alcohol, etherified with 20 EO×10 PO units, were added to the feed. The amount of initiator in feed 2 was increased to 150 g of sodium peroxodisulfate.

The polymer dispersion thus prepared contains 52.2% of nonvolatile components and has a pH of 5.4. The copolymer contained has a glass transition temperature of −19° C.

Example V-1

As for E-1, but only 75 g of the initiator sodium peroxodisulfate were used in feed 2.

The polymer dispersion thus prepared contains 51.4% of nonvolatile components and has a pH of 6.1. The copolymer contained has a glass transition temperature of −17° C.

Example V-2

As for E-1, but the amount of seed was reduced to 114 g and feed 1 was loaded with 240 g of HEA, 192 g of MAA and 7 050 g of styrene.

Example V-3

A commercial acrylate consisting of 2% of acrylamide, 30% of styrene and 68% of butyl acrylate was used as the comparative example.

In table A below, the amounts of the monomers used in each case, in % by weight, and additionally the amount of the initiator (NAPS—sodium peroxodisulfate) used, in mol %, based in each case on the total amount of the monomers a) to f) are shown in the novel examples E1–E7 and for the comparative examples V1–V3.

TABLE A

| Dispersion | Monomers [% by weight] |
|---|---|
| Example E1 | 6% of HEA, 44% of styrene, 50% of butadiene, 0.26 mol % of NAPS |
| Example E2 | 5% of HEA, 55% of styrene, 40% of butadiene, 0.38 mol % of NAPS |
| Example E3 | 5.5% of HEA, 0.5% of acrylic acid, 44% of styrene, 50% of butadiene, 0.38 mol % of NAPS |
| Example E4 | 0.5% of HEA in the initially taken mixture, 5.5% of HEA, 44% of styrene, 50% of butadiene, 0.26 mol % of NAPS |
| Example E5 | 6% of HEA, 44% of styrene, 50% of butadiene, 1% of emulsifier incorporatable by polymerization: allyl alcohol etherified with 10 EO units, 0.36 mol % of NAPS |
| Example E6 | 6% of HEA, 44% of styrene, 50% of butadiene, 1% of emulsifier incorporatable by polymerization: allyl alcohol etherified with 20 EO × 20 PO units, 0.38 mol % of NAPS |
| Example E7 | 6% of HEA, 44% of styrene, 50% of butadiene, 1% of emulsifier incorporatable by polymerization: allyl alcohol etherified with 20 EO × 10 PO units, 0.38 mol % of NAPS |
| Comparative example V1 | 6% of HEA (3.69 mol %), 44% of styrene (30.2 mol %), 50% of butadiene (66.1 mol %), 0.66% of NAPS (0.2 mol %) |
| Comparative example V2 | 2% of HEA (1.22 mol %), 1.6% of MAA (1.32 mol %), 50% of butadiene (65.78 mol %), 46.4% of styrene (31.69 mol %), 0.86% of NAPS (0.26 mol %) |
| Comparative example V3 | Acrylate |

II. Preparation of Building Materials Based on Polymer Dispersions Obtained and on Cement The polymer dispersions obtained from examples E1 –E7 and from comparative examples V1 –V3 were mixed with conventional additives and cement as hydraulic binder.

Composition of the Building Materials

Quartz powder 0–0.09 mm 20.5 parts, quartz sand 0.08–0.2 mm 22.5 parts, quartz sand 0.2–0.5 mm 30 parts, cement CEM I 42.5 R 25 parts, Lumiten E-P3108 2 parts, Agitan® 281 0.3 parts, polymer dispersion 30 parts (brought to a solids content of 50%)

Agitan® 281: Antifoam from Münzig
CEM I 42.5 R: Portland cement
Lumiten E: Antifoam from BASF Aktiengesellschaft

III Results of Experiments on the Processibility, Water Absorption and Mechanical Property of the Building Materials Obtained from II Determination of the Water Absorption, of the Tensile Strength and of the Elongation at Break:

Determination of the Water Absorption:

Polymer films having a dry film thickness of about 750 μm were produced from each polymer dispersion by drying for 7 days at 50° C. in a through-circulation dryer. 2 cm long and 1 cm wide pieces were cut out of the films in each case and stored in water for 24 hours at room temperature. The pieces were then superficially dried and weighed. The water absorption is calculated from the quotient of the film weights after and before storage in water.

Determination of the Tensile Strength and of the Elongation at Break:

In order to check the tensile strength and the elongation at break of the cement-containing materials obtained, cement films having a wet film thickness of 2 mm were produced from said materials. The films were hardened for 28 days under standard temperature and humidity conditions (23° C.; 50% relative humidity). The tensile strength and the elongation at break of the films were then measured by means of an automatic material tester at a take-off rate of 100 mm/min, similarly to DIN 53455.

TABLE B

| | Water | Processing | Water absorption 24 h | 48 h | 96 h | Mechanical property Tensile strength | Elongation at break |
|---|---|---|---|---|---|---|---|
| Dispersion Examples | | | | | | | |
| E-1 | 6 | good | 4.7 | 10.5 | 12.3 | 0.88 | 71 |
| E-2 | 5 | good | 3.5 | 7.6 | 8.7 | 1.57 | 14 |
| E-3 | 6 | good | 4.7 | 8.5 | 9.6 | 0.87 | 21 |
| E-4 | 6 | good | 2.6 | 7.3 | 7.8 | 1.21 | 16 |
| E-5 | 6 | good | 5.2 | 8.9 | 10.1 | 0.75 | 16 |
| E-6 | 6 | good | 4.9 | 9.4 | 11 | 0.7 | 22 |
| E-7 | 6 | good | 5 | 8 | 9.6 | 0.71 | 26 |
| Comparative examples | | | | | | | |
| V1 | 6 | poor* | * | * | * | * | * |
| V2 | 10 | poor* | * | * | * | * | * |
| V3 | 10 | good | 6 | 11 | 14 | 1.5 | 40 |

*Not processible, a brittle cracked film resulted and therefore no mechanical properties can be determined and the determination of the water absorption was also dispensed with.

The results of table B show that the novel examples E1–E7 are distinguished in particular by good processibility in combination with a high level of water tightness (low water absorption).

We claim:

1. A polymer dispersion comprising at least one copolymer which contains, as polymerized monomers, a) from 25 to 70% by weight of at least one conjugated aliphatic diene,
   b) from 25 to 70% by weight of at least one vinylaromatic monomer,
   c) from 2.5 to 15% by weight of at least one monoester of a $C_2$–$C_{10}$-alkanediol with acrylic acid or methacrylic acid,
   c') from 0.1 to 10% by weight of at least one alkylpolyethylene glycol (meth)acrylate of formula (I)

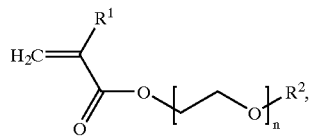

where $R^1$ is hydrogen or methyl, $R^2$ is $C_1$–$C_4$-alkyl and n is an integer from 1 to 100, or
   c'') from 2 to 15% by weight of a mixture of the monooester (c) and the alkylpolyethylene glycol (meth) acrylate c'),
   d) from 0 to 1.0% by weight of ethylenically unsaturated monomers which have at least one acid group, or salts thereof,
   e) from 0 to 5.0% by weight of ethylenically unsaturated nitrites, and
   f) from 0 to 1.0% by weight of amides of α,β-ethylenically unsaturated mono- and dicarboxylic acids, with the proviso that no protective colloid is present in the copolymer dispersion and the copolymer has a glass transition temperature ranging from more than −30° C. to less than +30° C.

2. The polymer dispersion as claimed in claim 1, which further comprises from 0 to 10% by weight, based on 100% by weight of the copolymer fraction, of at least one polymerizable emulsifier based on allyl alcohol alkoxylates.

3. The polymer dispersion as claimed in claim 1, wherein said polymerizable emulsifier is an allyl alcohol ethoxylate having 5 to 30 ethoxy units or an allyl alcohol propoxylate having 5 to 30 propoxy units.

4. The polymer dispersion as claimed in claim 1, wherein the polymer of the dispersion is prepared by initiating the reaction of monomer components by an initiator which is present in an amount of more than 0.2 mol %, based on the total amount of the monomer components a) to f) employed.

5. The polymer dispersion as claimed in claim 1, wherein said conjugated diene (a) is butadiene or isoprene.

6. The polymer dispersion as claimed in claim 1, wherein said vinylaromatic monomer (b) is styrene or α-methylstyrene.

7. The polymer dispersion as claimed in claim 1, wherein said monoester c) is a monoester of a linear $C_2$–$C_{10}$-alkanediol with acrylic acid.

8. The polymer dispersion as claimed in claim 1, wherein said component c') is an alkylpolyethylene glycol (meth) acrylate of formula (I)

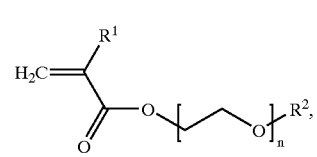

where $R^1$ is hydrogen or methyl, $R^2$ is methyl or ethyl and n is an integer from 5 to 55.

9. A polymer dispersion as claimed in claim 1, the copolymer comprising, as monomers, a) from 35 to 60% by weight of at least one conjugated aliphatic diene,
   b) from 35 to 60% by weight of at least one vinylaromatic monomer,
   c) from 2.5 to 10% by weight of at least one monoester of a $C_2$–$C_{10}$-alkanediol with acrylic acid or methacrylic acid,
   d) from 0 to 0.8% by weight of ethylenically unsaturated monomers which have at least one acid group, or salts thereof, and
   e) from 0 to 2.0% by weight of ethylenically unsaturated nitrites.

10. A building material based on a hydraulic binder comprising a polymer dispersion as claimed in claim 1.

11. A polymer powder or polymer granules, obtainable by removing at least 80% by weight of the volatile components from the polymer dispersion as claimed in claim 1, as an additive in building materials based on hydraulic binders.

12. A building material based on cement comprising a polymer dispersion as claimed in claim 1.

13. A process for improving the mechanical strength, elasticity and processability of building materials based on hydraulic binders, by mixing at least one hydraulic binder, at least one polymer dispersion as claimed in claim 1 and/or polymer powder or polymer granules prepared by removing at least 80% by weight of the volatile components from the polymer dispersion as claimed in claim 1, as an additive and, optionally, water and/or additives.

14. The process as claimed in claim 13, which comprises: mixing the polymer dispersion, the polymer powder or the polymer granules added with-the building material based on the hydraulic binder in an amount ranging from 20 to 200% by weight, based on the dry weight of the hydraulic binder.

15. A method of sealing a building material, comprising:
    applying to the building material a hydraulic binder comprising a polymer dispersion as claimed in claim 1 and/or a polymer powder or granules as claimed in claim 11 which seals said building material.

16. The polymer dispersion as claimed in claim 1, wherein the glass transition temperature of the copolymer ranges from more than −25° C. to less than +20° C.

17. The polymer dispersion as claimed in claim 1, wherein the glass transition temperature of the copolymer ranges from more than −20° C. to less than +10° C.

18. A polymer dispersion comprising at least one copolymer which contains, as polymerized monomers, a) from 25 to 70% by weight of at least one conjugated aliphatic diene,
   b) from 25 to 70% by weight of at least one vinylaromatic monomer,
   c') from 0.1 to 10% by weight of at least one alkylpolyethylene glycol (meth)acrylate of formula (I)

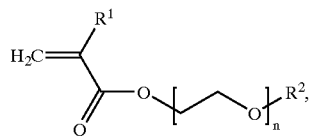

where $R^1$ is hydrogen or methyl, $R^2$ is $C_1$–$C_4$-alkyl and n is an integer from 1 to 100, or c″) from 2 to 15% by weight of a mixture of at least one monoester of a $C_2$–$C_{10}$-alkanediol with acrylic acid or methacrylic acid and the alkylpolyethylene glycol (meth)acrylate c′), d) from 0 to 1.0% by weight of ethylenically unsaturated monomers which have at least one acid group, or salts thereof, e) from 0 to 5.0% by weight of ethylenically unsaturated nitrites and f) from 0 to 1.0% by weight of amides of α,β-ethylenically unsaturated mono- and dicarboxylic acids, with the proviso that no protective colloid is present in the copolymer dispersion and the copolymer has a glass transition temperature ranging from more than −30° C. to less than +30° C.

* * * * *